United States Patent [19]
Overhoff

[11] 3,899,253

[45] Aug. 12, 1975

[54] APPARATUS AND METHOD FOR AUTOMATIC CROSS CORRELATION INTERFEROMETRY

[76] Inventor: Mario W. Overhoff, P.O. Box 8091, Cincinnati, Ohio 45208

[22] Filed: Sept. 10, 1973

[21] Appl. No.: 395,649

[52] U.S. Cl. ............................. 356/108; 356/112
[51] Int. Cl.² ........................................ G01B 9/02
[58] Field of Search ..... 356/106 R, 108, 112, 106 S

[56] References Cited
UNITED STATES PATENTS
3,482,919  12/1969  Barringer ......................... 356/106 S OTHER PUBLICATIONS
Flournou et al., "White Light Interferometric Thickness Gauge," Applied Optics, Vol. 11, No. 9, pp. 1907.

*Primary Examiner*—Ronald L. Wibert
*Assistant Examiner*—Conrad J. Clark
*Attorney, Agent, or Firm*—Mahoney, Miller & Stebens

[57] ABSTRACT

Apparatus and method for parameter measurement utilizing cross correlation of the interferometric properties of product and interferometer apparatus. A functional method based on cross correlation of interferometric properties utilizing broad band incoherent radiation and complementary detector. The product and interferometer of either Perot-Fabry or Fizeau type are interposed between the radiation source and detector with associated electronics providing an output indicative of the product parometer.

11 Claims, 5 Drawing Figures

APPARATUS AND METHOD FOR AUTOMATIC CROSS CORRELATION INTERFEROMETRY

BACKGROUND OF THE INVENTION

This invention relates to interferometric means of measuring physical properties of materials by use of broadband radiation.

The preferred embodiment of this invention, as actually constructed, employs electromagnetic radiation in the visible and near infrared region and was built for the purpose of measuring thin non-metallic films or slabs during production. The measurement is suitable for direct control of the machinery which produces the film for the purpose of regulating chosen product parameters, including but not restricted to thickness.

Most gauges used for automatic measurement and control operate by virtue of their ability to determine radiation energy loss in the measured material, and these gauges are relatively poor in precision, especially in the application to the measurement of very thin (less than 0.001 in) plastic films.

Various phenomena associated with wave radiation energy have been known for nearly two centuries. The interferometric properties of light were first analyzed correctly by Thomas Young in 1802 in his explanation for Newton's rings. Interferometers were first built by Fizeau in 1862, Michaelson and Benoit in 1895 and Fabry and Perot in 1897.

Numerous attempts to apply these principles to the measurement of thickness have been reported, but most techniques centered on the use of fixed or varying monochromatic radiation analysis. Techniques of this nature, including fringe counting methods are described in the following U.S. patents:

| No. | | | | |
|---|---|---|---|---|
| No. | 2,338,981 | Straub | January | 11, 1944 |
| No. | 2,518,647 | Teeple | August | 15, 1950 |
| No. | 2,882,787 | Mitchel | April | 21, 1959 |
| No. | 3,238,839 | Day | March | 8, 1966 |
| No. | 3,424,532 | Briggs | January | 28, 1969 |
| No. | 3,601,492 | Reichard | August | 24, 1971 |
| No. | 3,708,229 | Fircher | January | 2, 1973 |
| No. | 3,720,471 | Kasahara | March | 13, 1973 |

In contrast to the above methods, it is also possible to measure thickness with broadband or so called "white" light. Because of its mathematical foundations, this method is usually referred to as Fourier transform spectroscopy.

In one instance, U.S. Pat. No. 3,319,515 issued to Flournoy et al., the inventors disclose the use of a Michaelson interferometer driven with a sawtooth scan. An examination of this device shows that its performance is slow and uncertain, and it is highly doubtful that the described instrument can ever function outside the laboratory.

In another U.S. Pat. No. 3,348,446 issued to Young, the inventor discloses a novel interferometer and only alludes to potential application to thin film measurements in the text. In scientific literature the theoretical methods have been noted frequently, for example Loewenstein and Smith in *Applied Optics*, March 1971, Vol. 10, No. 3.

SUMMARY OF THE INVENTION

The present invention is the first device to be designed according to the principles of Fourier transform corelation interferometry which can successfully be applied to the measurement of on line control of process operations.

The design was embodied in an apparatus constructed especially for the measurement of thickness of thin plastic films. The apparatus, as built, is capable of measuring films with thicknesses in the range of 2 $\mu$m to 200 $\mu$m with a precision approaching 0.002 $\mu$m. Response is rapid, in the order of 0.1 second, and the operation and precision is essentially unaffected by sheet flutter or environmental disturbances. The apparatus was constructed specifically for on-line control, but can also be used for off-line measurement of individual film samples. The apparatus can also be used to measure separately the individual layers of multiply films.

Objects of the invention are to provide interferometric instruments and various interferometric techniques together with suitable electronic systems utilizing such interferometric techniques for the rapid and accurate measurement of certain physical properties of materials in film, sheet or slab form. Such properties include but are not restricted to thickness, individual thicknesses of multilayer sheets and of dielectric constant, refractive index, velocity of propagation and density; such instruments being rugged and reliable as demanded indispensably by industrial automatic process control applications.

The substance and nature of the invention can be shortly characterized in a principal aspect as contemplating the combination of the following individual major components:

1. A broadband source of incoherent radiation of electromagnetic or acoustic nature, or any other propagated wave nature.
2. An interferometer possessing two active "optical" surfaces adaptive to the particular radiation, one surface being semitransparent and the second being either semitransparent or it may be totally reflective; such interferometers being generically known as Fabry-Perot or Fizeau interferometers. The interferometer is constructed such that the spacing between the "optical" surfaces can be made to vary.
3. An energy detector and a suitable electronic system to automatically vary and regulate the spacing of the interferometer.

The substance and nature of this invention further contemplates the display of the control signal to the interferometer as a measurement of the product material and also contemplates the further use of the control signal for the purpose of automatic control or regulation of the process or machinery apparatus which produces the said product material.

By proper choice of the materials of construction of these three major components, this invention can be readily applied to the measurement of a wide variety of single or multi-ply films, sheet or slab products including but not restricted to the following:

natural or synthetic films, vitreous substances, metal foil and plates, cements, ceramics as well as gases or liquids.

These and other useful objects and aspects of the nature of the invention will appear from the following presentation of its theoretical principles, so far as desirable for its understanding by those versed in the art of electro-optical engineering, and of a detailed description and accompanying drawings of a practical embodiment as actually constructed and tested, it being understood that the application of the invention to further measurements involves identical methodology and technique with individual obvious changes in construction as demanded by any particular application.

DESCRIPTION OF THE DRAWING FIGURES

DETAILED DESCRIPTION OF THE INVENTION

The first part of the following presentation is concerned with the wave, or "optical" system and the second part is concerned with the electronic system. The word "optical" is utilized in this description as also applying to systems that operate with radiation other than in the visible spectrum, such as acoustic, infrared or ultraviolet radiation.

Figure 1:
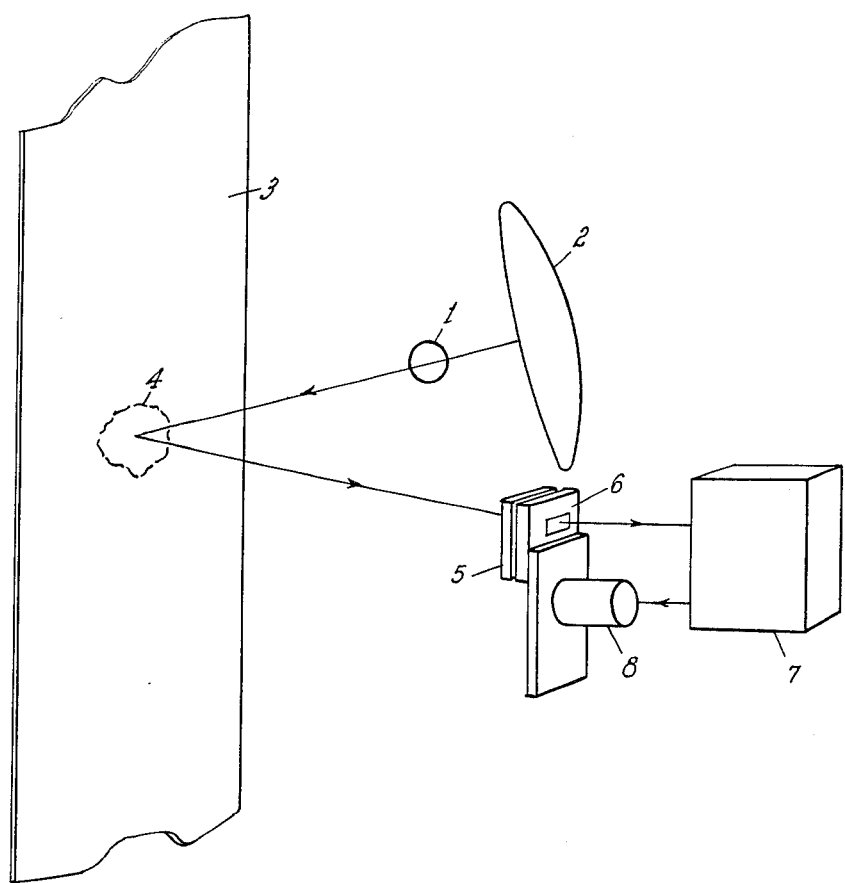
FIG. 1 is a schematic diagram of a basic configuration of the elements in an "optical" system embodying this invention.

With reference to FIG. 1, the "optical" system can be described as follows:

Wave radiation is emitted by a source 1. The source chosen will depend on the particular radiation selected which includes but is not restricted to X-ray, ultraviolet, visible, infrared, microwave, radio or acoustic radiation. In the preferred embodiment the source is an incandescent lamp emitting visible and infrared radiation. The radiation is partially concentrated by an optical system 2 appropriate for the specific radiation and directed towards the product material 3 which is shown as a thin film strip, a small patch 4 of the product material being illuminated.

As shall be explained in the theoretical principles, the radiation leaving the product material after reflection, as shown, or transmission, which is not shown, differs in spectral composition from the original incident radiation.

This modified radiation is directed towards a variable spacing interferometer 5, consisting of two "optical" surfaces of either a Fabry-Perot type, as shown, or a Fizeau, not shown. A descriptive definition of both types is found in "NON DESTRUCTIVE TESTING HANDBOOK" edited by Robert C. McMaster, published by the Ronald Press Company, 1959, at page 10.13. The pertinent portion is quoted as follows:

"* * * an interferometer suitable for testing transparent media is the etalon, which was derived from the Perot-Fabry interferometer. It consists essentially of two highly reflecting, yet slightly transparent, mutually parallel, flat surfaces which are separated and viewed in transmitted or reflected light. A single transparent surface functions to divide a beam into a pair of beams, one transmitted and the other reflected. Interference is produced by multiple reflection. Phase changes occurring in local inhomogeneities in the test sample are shown up as differences of intensity and color in the interference fringes. A similar method is used with great success fy Tolansky, who produced very sharp fringes of the Fizeau type by depositing highly reflecting layers of silver on the test sample (also onto crystal faces) and on a reference flat."

The radiation emerging from the interferometer 5 is finally transduced into an electric signal by a suitable detector 6. In the preferred embodiment the detector can take the form of a semiconductor quantum detector, but, to suit the choice of radiation, can take the form of scintillators, photomultipliers, phototubes, bolometers, microwave detectors, radio detectors, microphones or other suitable transducer.

The electric signal generated by the transducer 6 is amplified and processed by the electronics 7 which generates a suitable signal for transducer 8 which mechanically regulates and drives the spacing of the interferometer 5 in accordance with the theoretical principles as shall be expounded. This transducer can take the form of an electromagnet, a piezo strictive or magneto strictive transducer or other electric or pneumatic device.

The details of the electronic system concerning the correlation detection and the automatic drive to the interferometer will be expounded in later paragraphs, subsequent to the theoretical principles presented here for ease of understanding.

Figure 2:
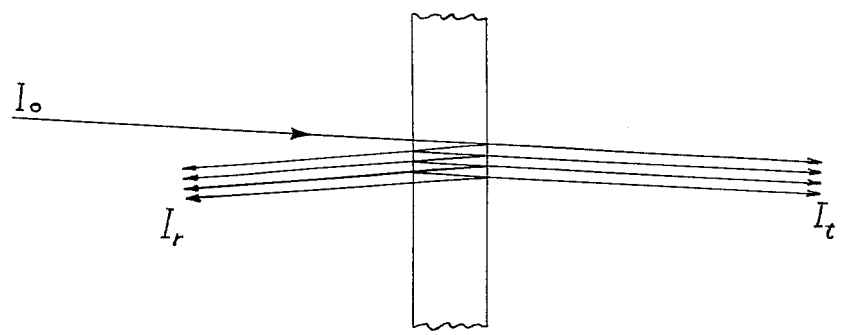
FIG. 2 is a diagramatic illustration of the geometric relationships of the interaction of wave energy at two surface boundaries.

FIG. 2 illustrates the behavior of wave radiation interacting at two plane "optical" surfaces.

Many standard textbooks, including Born & Wolf, Jenkins & White or A. H. Cook give the following formula for the case of radiation normally incident upon the "optical" surfaces.

$$\frac{I_R}{I_o} = \frac{\left(1 - \frac{A}{1-R}\right)^2}{1 + \frac{4R}{(1-R)^2} \sin^2 ks} \quad (1)$$

where:
$I_o$ is the intensity of the incident radiation.
$I_r$ is the intensity of the reflected radiation.
$A$ is the co-efficient of attenuation of an "optical" surface.
$R$ is the co-efficient of reflection of an "optical" surface.
$k$ is the wave number of the radiation.
$s$ is the spacing between the two "optical" surfaces.

It is to be noted that, in general, the quantities $A$ and $R$ are themselves functions of wave number cf. Born & Wolf, and, furthermore, the expression can be somewhat modified for the case of non-normal illumination incidence.

This expression essentially described the radiation characteristics of not only the product material but also those of the interferometer, except for effects due to roughness of the surface of the product material. In materials with rough surfaces one may assume Rayleigh scattering, implying that the interferometric characteristics at higher wave numbers will "wash out" at a fourth power rate. Neglecting scattering we may write the spectral distribution functions as follows: For the product material:

$$G(k,d) = \frac{1 - \left(\frac{A}{1-R}\right)^2}{1 + \frac{4R}{(1-R)^2} \sin kd} \quad (2)$$

For the interferometer:

$$F(k,l) = \frac{\left(1 - \frac{a}{1-r}\right)^2}{1 + \frac{4r}{(1-r)^2} \sin kl} \quad (3)$$

where:
$d$ is "optical" thickness of the product material.
$l$ is the spacing of the interferometer surfaces.
The source of radiant energy, being thermal in nature, can be presumed to follow Planck's equation for black bodies.

$$N(k,T) = \frac{2\pi c^2 h k^3}{e^{\frac{hck}{k_b T}} - 1} \quad (4)$$

where:
$N(k, T)$ is the intensity.
$h$ is Planck's constant.
$k_b$ is Boltzmann's constant.
$c$ is the velocity of light.
$T$ is the absolute temperature.

Finally, the expression for the photo electric efficiency of quantum detectors can be quoted:

$$\eta(k) = \beta_k \frac{hc}{e_o k} \text{ for } k \geq k_c \quad (5)$$

$$= 0 \text{ for } k < k_c \quad (5a)$$

where:
$\beta_k$ is the spectral responsitivity.
$e_o$ is the unit electronic charge.
$k_c$ is the cut off wave number.

It can thus be stated that the electric signal $E(d,l)$ generated as a function of the thickness $d$ of the product material and the interferometer spacing $l$ can be written as:

$$E(d,l) = \int_0^\infty G(k,d) F(k,l) N(k,T) \eta(k) dk \quad (6)$$

This integral may be solved with the aid of Fourier transforms.

For the present purpose it is not necessary to present a completely rigorous analysis. Instead, we can approximate by substituting a box car function for the convoluted spectral behavior of the terms $N(k, T)$ and $\eta(k)$.

If we make such approximations; we can write:

$$G(k,d) \approx 1 + g \sin kd \quad (7)$$

$$F(k,l) \approx 1 + f \sin kl \quad (8)$$

We can then replace the integral function (6) by the following approximation:

$$E(d,l) = \int_{k_1}^{k_2} (1+g \sin kd)(1+f \sin kl) dk \quad (9)$$

Dropping all constant or quasi-constant terms, we can immediately write a solution:

$$E(d,l) = \frac{\alpha}{2(1-d)} [k_2 \sin(1-d)k_2 - k_1 \sin(1-d)k_1] \quad (10)$$

where:
$k_2$ is the box car upper limit wave number.
$k_1$ is the box car lower limit wave number.
$\alpha$ is a constant of proportionality.

In general $k_2 >> k_1$ so that the expression simplifies to the simple form:

$$E(d,l) = \frac{\alpha k_2}{2(1-d)} \sin(1-d)k_2 \quad (11)$$

Figure 3:
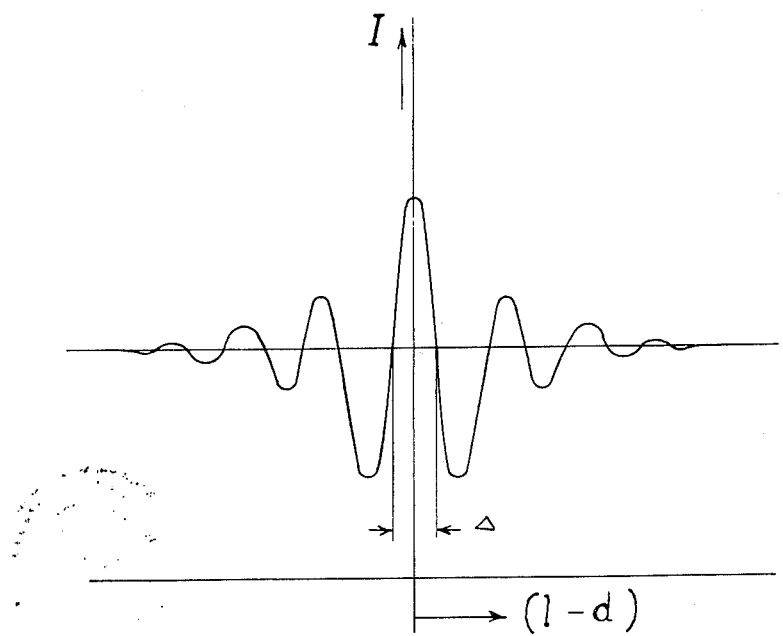
FIG. 3 is a graph of a correlation convolution interferogram which represents the detected signal.

This function is recognized as the familiar $(\sin x/x)$ function which is shown in FIG. 3.

In fact, if we substitute:
$l = d + \delta$ where $\delta$ is the scan deviation of the interferometer then:

$$E(\delta) = \alpha k_2 \frac{\sin k_2 \delta}{\delta} \quad (11a)$$

The separation $\Delta$ between the first two zeros of the interferogram on either side of the central maximum is given by:

$$\Delta = \frac{1}{2\pi k_2} \quad (12)$$

It is seen that, for good resolution, i.e., for a narrow central maximum peak, one requires the presence of high wave numbers. When considering the application of the method to the measurement of any specific product material it is therefore necessary to choose a radiation source rich in wave lengths much shorter than the measured thickness.

Conversely, if the particular choice of a radiation source is imposed, then the central maximum peak becomes progressively sharper and higher as the product thickness increases until Rayleigh scattering ultimately reverses the trend.

On the basis of the foregoing I can now describe the electronic system.

The clear purpose of the electronic system is to monitor the particular spacing of the interferometer which accurately corresponds to the optical thickness of the product material. If the interferometer spacing is made to vary periodically, then, in the neighborhood of the critical value, a detector 9 disposed to be responsive to incident radiation from the interferometer 6 will generate an electric signal with a wave shape as shown in FIG. 3.

Figure 4:
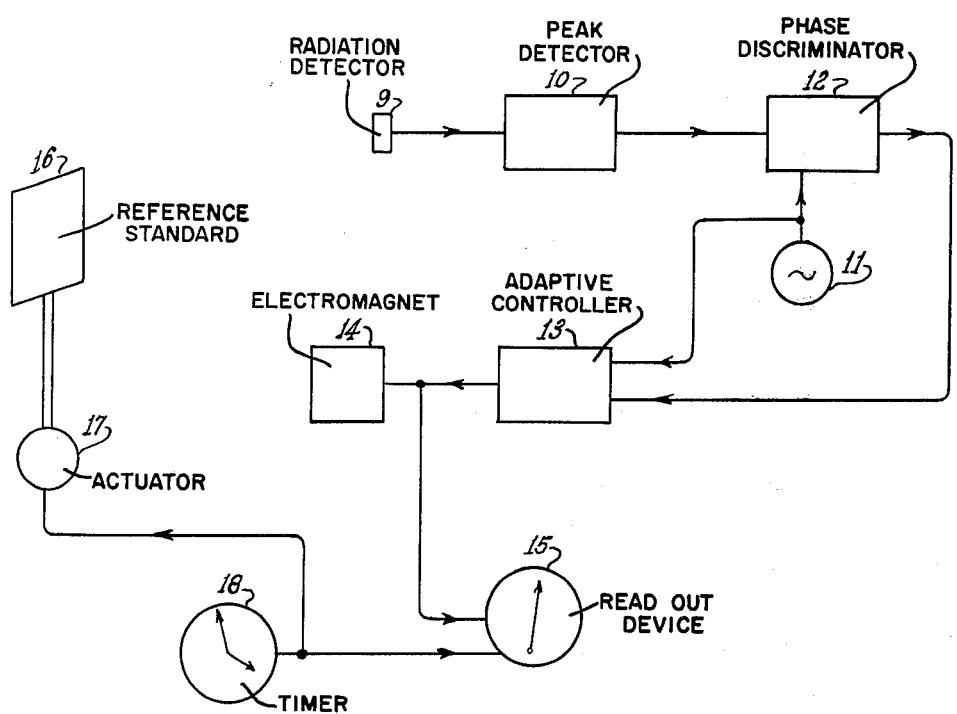
FIG. 4 is a basic block diagram of the electronic system.

Referring to the simplified block diagram, FIG. 4, the signal generated by detector 9, is directed to a peak detector 10 which generates a sharp "marker" pulse at the instant at which the interferogram reaches exact maximum.

The interferometer is energized with a sinusoidal scanning signal superposed on a "steady" signal which controls the average spacing. As shown in FIG. 4, the drive is provided by an electromagnet, 14, which is supplied by the adaptive controller 13, which, in turn, derives its incoming periodic signal from the oscillator 11 and its "steady" signal from the phase discriminator 12.

Action takes place as follows: The phase discriminator 12 provides a signal output which relates to the algebraic time difference between the instant of mid-scan and the instant at which the correlation interferogram reaches maximum.

This signal is the "steady" signal input to the adaptive controller 13 and it serves the obvious purpose to cause the interferometer to so adjust itself that the correlation maximum coincides with the mid-scan.

If the electromechanics of the interferometer and its drive are linear, it is then also obvious that the "steady" signal component is accurately proportional to the "optical" thickness of the product material. This "steady" signal is, after proper transformation, displayed on any suitable readout device 15.

To overcome instrument drift the following standardization method is indicated in FIG. 4. At regular intervals, or upon demand, a timer 18 will trigger an actuator 17 to introduce a reference standard sample 16 into the radiation path for a suitable period of time. Simultaneously, the display unit is forced to indicate a value correctly corresponding to the thickness of the reference standard. The internal offset forcing signal required for correction (if any) is firmly held until such time as the next standardization takes place.

Instead of using an external standard sample it is possible to attach a simple electric contact (switch) to the interferometer plates themselves so that a make-break electric signal may be obtained to correspond to an accurately known interferometer spacing. This system is readily apparent and is therefore not shown.

Figure 5:
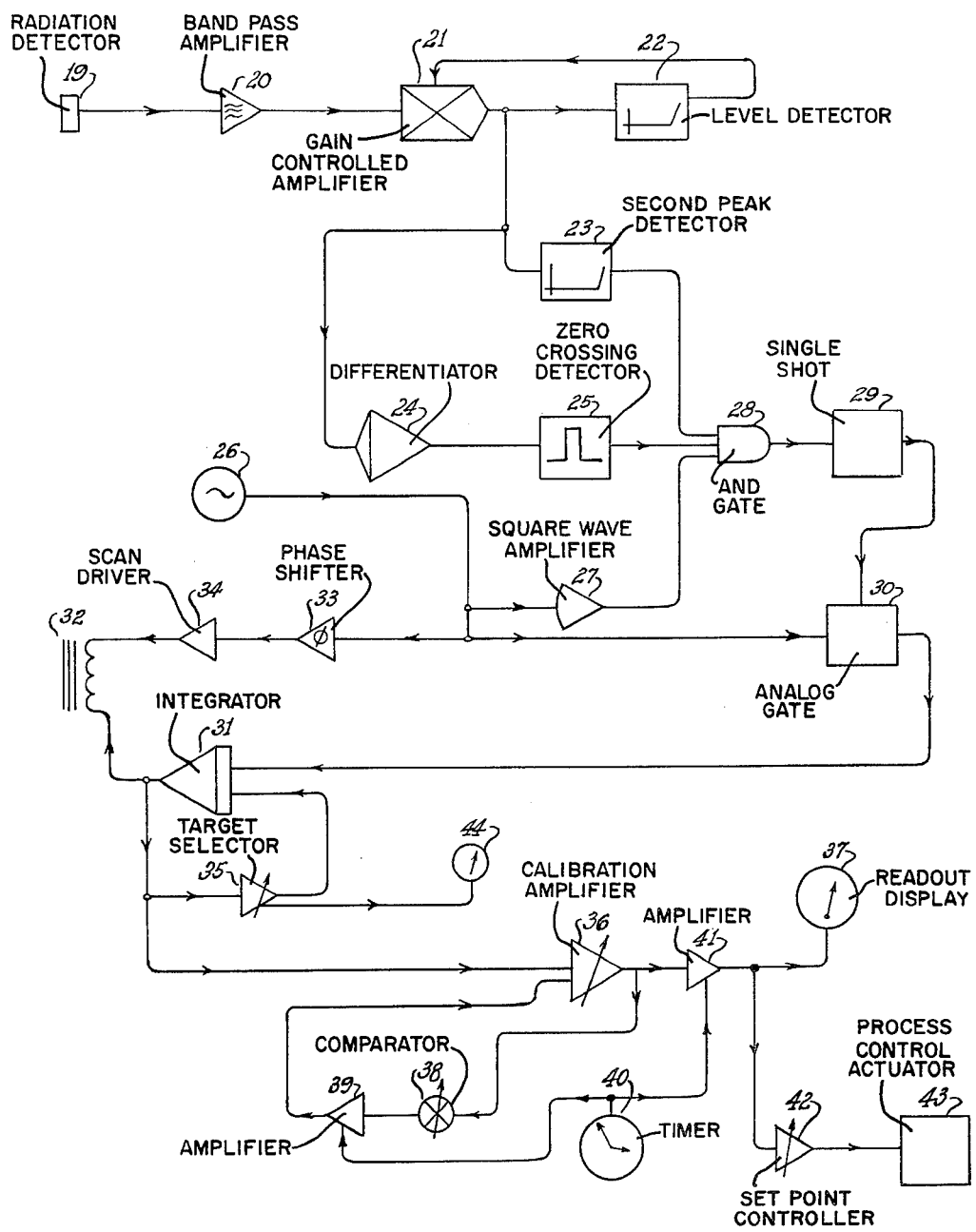
FIG. 5 is a detailed diagram of the electronic system.

A more complete description of the electronic system is given in the detailed block diagram FIG. 5. The signal from the radiation detector 19 is amplified and processed by the bandpass preamplifier 20 in order to reduce signal components related to product sheet flutter and intrinsic detector noise. The output from 20 is controllably amplified by the gain control amplifier 21 and sent to a level detector 22 which generates a signal subsequently fed back to 21 in order that the signal peak at the output of 21 (see FIG. 3) be held at a constant amplitude.

A second peak detector 23 generates a logic signal for a period of time corresponding to the occurrence of a selected uppermost portion of the signal peak. The analog signal from 21 is also differentiated by 24, the resultant signal being analyzed for zero values by the zero crossing detector 25 which generates a logic signal every time the differential of the signal equals zero. One of these times corresponds to the exact instant during which the signal peak (FIG. 3) reaches exact maximum. The sinusoidal signal from the oscillator 26 is amplified into a square wave by amplifier 27 which is taken as a logic signal corresponding to the one half of the scan cycle during which the interferometer travels in a chosen direction.

The three signals, from 23, 25 and 27, arrive at the AND gate 28 which produces a logic pulse at the instant at which the signal peak (FIG. 3) reaches its main maximum. This logic pulse triggers a single shot 29 which generates a pulse of uniform narrow width.

The pulse from the single shot 29 is used to strobe the analog gate 30 whose output is a pulse whose duration is the same as that of the strobing pulse but whose amplitude and polarity now corresponds to the oscillator phase at the instant of strobing. In particular, if the strobing occurs when the oscillator phase equals zero, then the gate 30 output is also equal to zero. Differences from such a zero condition are integrated and amplified by the integrator 31 which supplies the d. c., or steady state, current to the interferometer driver 32. The a. c. scanning signal for the driver 32 is derived from the oscillator 26 after phase shifting by 33 and power amplification by the scan driver 34. The phase shifter 33 is required to bring the oscillator signal and the mechanical motion of the interferometer into phase.

In order for the system to first acquire the signal, the output of the integrator is sector limited by the target selector 35. The action of this circuit is to restrict the range of the "steady" interferometer drive signal to such values for which the system is presumed capable of scanning across the signal peak. The target selector can be controlled manually and is generally centerset to correspond to the product material target value. This system also insures automatic retrieval of system lock if the signal should be lost temporarily.

The d. c., or steady state, signal from the integrator 31 is processed by the calibration amplifier 36. By means of appropriate adjustment to the zero offset and to the gain of amplifier 36, it is possible to obtain direct data readout from the display 37 in any suitable engineering units.

Automatic standardization is obtained by means of a comparator 38 and a sample and hold amplifier 39. The action is as follows: When the timer 40 introduces the standard sample (item 16 in FIG. 4) the signal from 36 should have a value corresponding to correct gauge measurement. The signal from 36 is compared by 38 to the preset value and any "errors" are amplified by 39 and looped back to the input of 36. At the end of the standardization interval the sample and hold amplifier 39 will hold the error offset signal until such time as the next standardization is to take place. The signal from the calibration amplifier 36 is clamped at the last value prior to the onset of the standardization interval by means of the sample and hold amplifier 41. The clamping is again released as soon as the standardization interval has been completed.

The output from amplifier 41 is displayed by 37 which can be in the form of analog or digital panel meters, chart recorders, TV displays or other suitable devices. The signal from 41 can also serve to actuate setpoint controllers 42 or the signal can be fed to analog or digital computers which, in turn, can regulate the manufacture of the gauged process material by direct control of a process control actuator(s) 43 through whose action the product parameter can best be influenced.

Also shown in FIG. 5 is a deviation meter 44 which aids the operator in adjusting the target selector 35. Not shown in the diagram is an optical oscilloscope which can serve to display some of the circuit signals including the outputs from 20, 21, 25 and 29.

At the sacrifice of some versatility, some of the components, including 9 and 44, can be eliminated. Other elements which are not shown even in the detailed block diagram could be added for extra convenience. One such element could consist of a circuit to automatically influence scan drive through a wide search program in order to fully automate signal acquisition. Actual circuit configuration of the indicated blocks can take many individual forms, such being well known to those versed in the art of electronic engineering.

The entire system comprising the source of radiation, the interferometer and the electronics is thus capable of gauging thickness of sheets or slabs of solid, liquid or even gaseous materials. The precision of the method is inherently much higher than that obtained by other and older methods. The apparatus also serves to measure separately the individual plies in a multilayered structure, provided only that the velocity of wave propogation undergoes change across the boundaries from ply to ply.

Various other properties, such as the measurement of the refractive index, the coefficient of elasticity, the density of gases, the presence of flaws and voids are often also amenable to gauging by interferometric means and can therefore be measured by instrumentation as described here.

Although only one basic configuration is illustrated and described in detail, it will be readily apparent that modifications may be made within the scope of this invention. It has been mentioned that either a Fabry-Perot or a Fizeau type interferometer may be utilized. It is also apparent from the illustrations and specification that this interferometric apparatus and method may be applied to be responsive to radiation transmitted through the product or reflected and that it is immaterial what relative position is occuped by the product and interferometer.

Having thus described the invention, what is claimed is:

1. Interferometric apparatus for determining a physical parameter of a product comprising
    a source of broadband radiation emitting within a predetermined spectrum,
    a broadband radiation detector responsive to propagated radiation emitted by said source and forming a signal proportional to the radiation detected,
    a multiple reflection interferometer interposed with the product in the path of the propagated radiation detected by said detector and modifying such radiation, said interferometer having two relatively opposed optical surfaces, one of which surfaces being partially transmissive and the other being at least partially reflective of the radiation and including means coupled therewith for varying the physical spacing between said surfaces, and
    electrical circuit means interconnected with said radiation detector and said interferometer responsive to the detector signal for varying the spacing of said optical surfaces by a periodic signal superimposed on a variable steady state signal to provide an output proportional to the cross correlation between interferometric properties of the product and said interferometer and indicative of the product parameter.

2. Interferometric apparatus according to claim 1 wherein said interferometer is disposed in the path of radiation transmitted through the product.

3. Interferometer apparatus according to claim 1 wherein said interferometer is disposed in the path of radiation reflected from the product.

4. Interferometer apparatus according to claim 1 in which said interferometer is of the Fabry-Perot type.

5. Interferometer apparatus according to claim 1 in which said interferometer is of the Fizeau type.

6. Interferometric apparatus according to claim 1 wherein said electrical circuit means varies the steady state spacing of said interferometer optical surfaces to optically coincide with the effect of the physical parameter of the product and equivalent to said steady state signal, said periodic signal effecting a variation of the optical surface spacing to a predetermined maximum relative to the steady state spacing.

7. Interferometric apparatus according to claim 1 which includes process control means responsive to the steady state signal and operable to modify the process producing the product in accordance with deviation of the steady state signal from a predetermined value to thereby control said physical parameter.

8. Interferometric apparatus according to claim 7 which includes reference means selectively interconnected therewith and which provides a standard reference input, said apparatus responsive to said input to maintain said predetermined value steady state signal.

9. An interferometric method for determining a physical parameter of a product consisting of
    directing broad spectral band radiation at least partially transmitted by the product into incident relationship to the product producing reflected radiation spectrally modified in accordance with principles of interference,
    further spectrally modifying the radiation incident to the product by a multiple reflection interferometer having two relatively opposed optical surfaces, one of which surfaces being partially transmissive and the other being at least partially reflective of the radiation with the steady state physical spacing between said surfaces selectively controlled and periodically varied relative to the steady state spacing,
    detecting the radiation thus modified by the product and the interferometer and forming a signal related to the radiation thus detected, and
    applying the signal thus formed to vary the steady state spacing of said interferometer optical surfaces to obtain a spacing therof optically equivalent to the physical parameter of the product thereby maximizing the signal thus formed and which is proportionally related to the product's physical parameter.

10. An interferometric method according to claim 9 including the step of controlling a process producing the product in accordance with the formed signal.

11. An interferometric method according to claim 9 in which a standard reference signal is selectively applied at periodic intervals for standardization.

* * * * *